Sept. 1, 1936. A. F. LARSEN 2,053,004
COFFEE MAKER
Filed Aug. 12, 1935
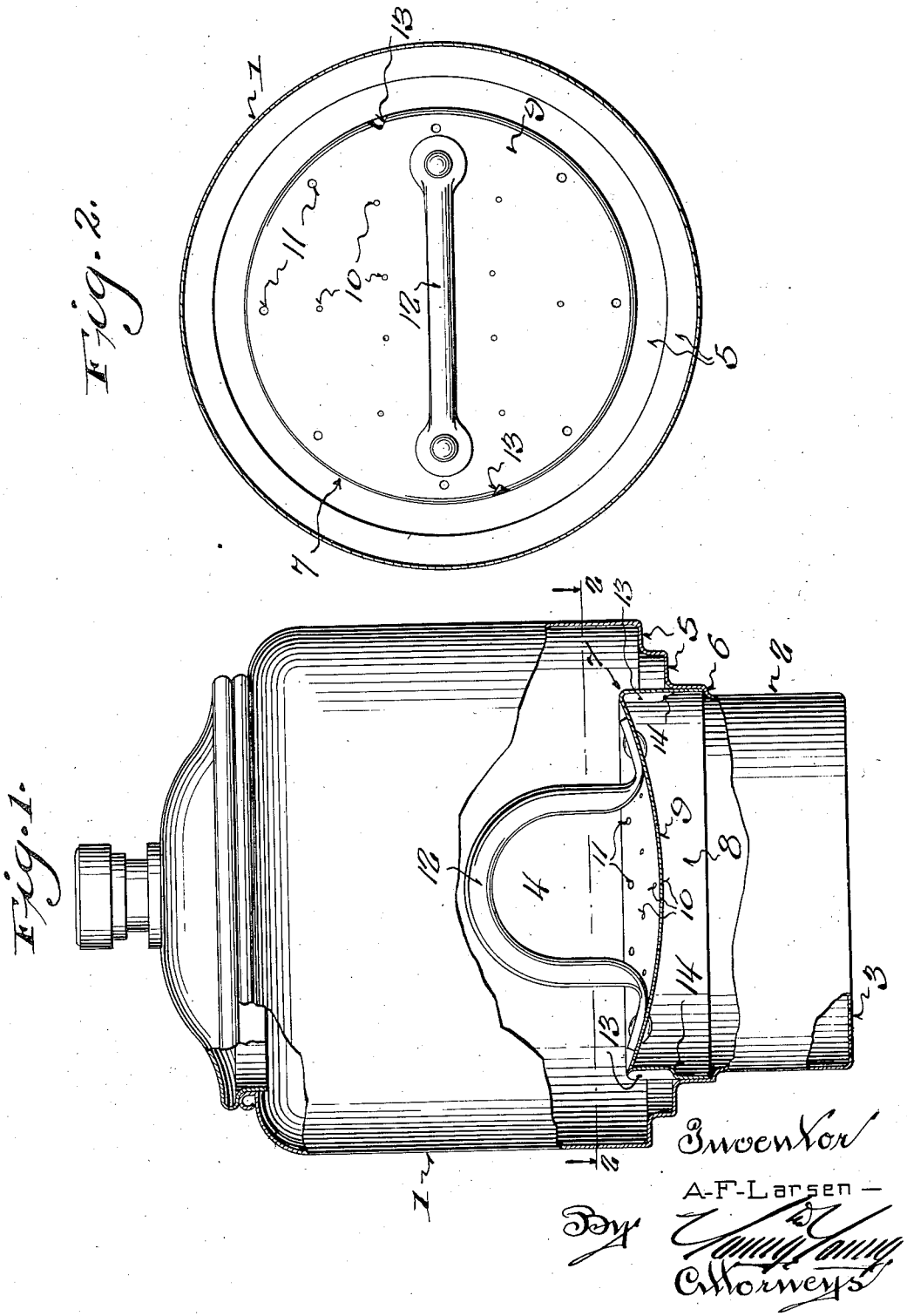

Patented Sept. 1, 1936

2,053,004

UNITED STATES PATENT OFFICE 2,053,004

COFFEE MAKER

Alantser F. Larsen, Manitowoc, Wis., assignor to Aluminum Goods Manufacturing Company, Manitowoc, Wis.

Application August 12, 1935, Serial No. 35,806

2 Claims. (Cl. 53—3)

This invention pertains to coffee makers, and more particularly to what are commonly termed drip coffee makers, wherein a receptacle is provided with a coffee compartment in its lower portion, and a reservoir above said compartment, whereby boiling water is caused to pass through the coffee from the reservoir to extract the desired ingredients therefrom.

In devices of the foregoing character it is customary to provide a perforated cover for the coffee compartment, which serves to both confine the coffee and at the same time cause a slow evenly distributed flow of water through the mass to obtain the desired extraction. Difficulty thus far encountered in connection with the foregoing operation results from the fact that the water coming in contact with the coffee causes the same to expand and liberate volatile gases, which create a pressure within the coffee compartment and obstruct the perforations in the cover, with the result that the flow of water from the reservoir is affected. Consequently, various attempts have been made to form the cover of the coffee compartment so that the gases will be quickly released without affecting passage of water into the compartment, but due to the fact that the liberated gases have a tendency to form in bubbles, which have a capillary affinity for the cover, the pressure resulting from the head of the water above the cover prevents their escape through the perforations, and in instances where the perforations are sufficiently large to permit the escape of the gas bubbles, the flow of water from the reservoir into the coffee compartment is too rapid.

It is, therefore, the primary object of the present invention to provide a cover for the coffee compartment of a drip coffee maker so formed that the volatile gases will be quickly released without affecting or obstructing the desired passage of water from the reservoir into said compartment.

Incidental to the foregoing, a more specific object of the invention resides in the provision of a cover having a perforated top dished downwardly from its peripheral edge and provided with a plurality of relatively larger openings in the high point of the cover adjacent its peripheral edge, whereby the bubbles of liberated gas will flow or climb the lower surface of the cover to the high outer edge where they are readily released through the enlarged openings permitting a slow uniform passage of water through the inner restricted openings.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing, Figure 1 is an elevation of a coffee maker constructed in accordance with the preferred form of the present invention, parts being broken away and in section to more clearly illustrate the structural features, and Figure 2 is a transverse section taken on the line 2—2 of Figure 1.

Referring now more particularly to the accompanying drawing, the numeral 1 designates a container provided with a lower restricted portion 2, having a perforated bottom 3, the enlarged upper portion serving as a reservoir 4. Intermediate the reservoir and restricted portion 2 the container is provided with a plurality of shoulders 5, which permit the same to be positioned upon coffee receptacles of varying size. Also, the lower restricted portion 2 is provided with a shoulder 6 which serves as a stop for a cover 7 for the coffee compartment.

The foregoing is more or less conventional structure, and, therefore, forms no part of the present invention other than as part of the general combination hereinafter claimed.

The salient feature of this invention resides in the construction of the cover 7, which comprises an annular flange 8 and a downwardly dished top 9 provided with a series of perforations 10 spaced inwardly from its peripheral edge, and relatively large spaced perforations 11 formed in the high point of the cover adjacent its edge. A handle 12, riveted or otherwise secured to the cover, facilities insertion or removal of the cover.

As will be noted in the drawing, the flange 8 of the cover 7 extends above the lower shoulder 5, thus normally forming a pocket and, therefore, in order to permit complete drainage of the reservoir the flange 8, at spaced intervals, is provided with indentures 13, which constitute pockets provided with perforations 14 in their lower ends, which permit complete drainage of the water reservoir.

In operation, the desired amount of coffee is placed in the restricted portion 2 of the container, after which the cover 7 is inserted and forced downwardly against the annular shoulder 6. A proper quantity of boiling water is then poured into the reservoir 4 and obviously the perforated cover 7 not only confines the coffee in the lower compartment of the container but permits a distributed flow of water through the mass of coffee in the restricted bottom, which effects an initial quick extraction of the essential oils from the coffee, and subsequently attains a prolonged extraction of the tannin and other elements of slow extraction, thus obtaining a beverage of maximum quality and palatability.

As the mass of coffee becomes saturated, and volatile gases are released, the same will naturally rise until they contact the perforated top 9 of the cover 7, where in most instances they are held through capillary attraction. However, due to the dished character of the top 9, the bubbles of gas are caused to flow towards the peripheral edge of the cover, being unable to escape through the restricted openings 10. This action leaves the openings 10 free to permit the desired passage of water into the coffee compartment, and when the gas bubbles reach the high point of the cover 9, adjacent its peripheral edge, the same are readily released through enlarged openings 11.

It will be apparent that the gas liberated through the openings 11 will more or less obstruct the passage of water therethrough with the result that the flow is limited in volume and speed to obtain the most desired results.

In the prior art it has always been the practice to liberate volatile gases through a perforated dome formed in the cover of the coffee compartment, but obviously such structures collect the gases at a central point, and because of the weight of the head of water contained within the reservoir, the gases are not released, with the result that the pressure maintained within the coffee compartment is sufficient to obstruct or effect flow of water into the same.

From the foregoing it will be readily apparent that the present invention provides an exceedingly simple, inexpensive, and effective improvement in coffee makers, which operates to effect the desired extraction of ingredients from the coffee, it being borne in mind that to accomplish this it is highly essential that the flow of water be definitely predetermined as to speed and volume, as well as uniform, regardless of conditions developed within the coffee maker, as the result of utilizing varying qualities of coffee and water of varying temperature.

I claim:

1. In a coffee maker comprising a container having a perforated bottom and a coffee compartment in its lower portion; a cover for the coffee compartment having an downwardly, spherically dished top and an annular depending flange, said top being provided with a plurality of openings adjacent its peripheral edge between the top and flange and a series of restricted openings centrally of the first openings.

2. In a coffee maker comprising a container having a perforated bottom and a coffee compartment in its lower portion; a cover for the coffee compartment having a downwardly, spherically dished top and an annular depending flange, said top being provided with a plurality of openings adjacent its peripheral edge between the top and flange and a series of restricted openings centrally of the first openings, and a bowed handle having its ends secured to the cover adjacent its edge.

ALANTSER F. LARSEN.